US011475117B2

(12) United States Patent
Duchastel (10) Patent No.: US 11,475,117 B2
(45) Date of Patent: Oct. 18, 2022

(54) EYE AND HEAD TRACKING AUTHENTICATION

(71) Applicant: CITRIX SYSTEMS, INC., Burlington, MA (US)

(72) Inventor: Thierry Duchastel, Cooper City, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 543 days.

(21) Appl. No.: 16/443,999

(22) Filed: Jun. 18, 2019

(65) Prior Publication Data

US 2020/0401686 A1 Dec. 24, 2020

(51) Int. Cl.
*G06F 21/36* (2013.01)
*H04W 12/61* (2021.01)
*G06F 3/01* (2006.01)
*G06F 21/40* (2013.01)

(52) U.S. Cl.
CPC .............. *G06F 21/36* (2013.01); *G06F 3/012* (2013.01); *G06F 3/013* (2013.01); *G06F 21/40* (2013.01); *H04W 12/61* (2021.01)

(58) Field of Classification Search
CPC .......... G06F 21/36; G06F 3/012; G06F 3/013; G06F 21/40; G06F 21/31; H04W 12/61; H04W 12/68; H04W 12/06; H04L 2463/082
See application file for complete search history.

(56) References Cited

U.S. PATENT DOCUMENTS

| 5,844,544 | A | * | 12/1998 | Kahn | G06F 3/0236 345/32 |
| 10,157,504 | B1 | * | 12/2018 | Jain | G06F 21/31 |
| 2012/0321087 | A1 | * | 12/2012 | Fleischman | H04L 9/3213 380/279 |
| 2015/0084864 | A1 | * | 3/2015 | Geiss | G06F 21/316 345/158 |
| 2015/0220723 | A1 | * | 8/2015 | George | G06F 21/36 726/19 |
| 2015/0339468 | A1 | * | 11/2015 | Son | G06F 3/012 726/19 |
| 2017/0109513 | A1 | * | 4/2017 | Skogo | G06K 9/00604 |

(Continued)

FOREIGN PATENT DOCUMENTS

CN 109891368 A * 6/2019 ............. G06F 3/013

*Primary Examiner* — Carl G Colin
*Assistant Examiner* — Hany S. Gadalla
(74) *Attorney, Agent, or Firm* — Banner & Witcoff, Ltd.

(57) ABSTRACT

A system includes at least one data processor and memory storing instructions which, when executed by the at least one data processor, configures the at least one data processor to: provide, via a display, a visual stimulus including an animation containing at least a first object and a second object, the visual stimulus prompting for user input for authentication to a virtual domain; monitor movement of a user while providing the visual stimulus; identify, based on the monitoring, a sequence of dwell times of a characteristic of the user's movement with respect to the first object and the second object; compare the identified sequence of dwell times to a stored sequence of dwell times; and provide the comparison to enable authentication of the user in the virtual domain. Related apparatus, systems, techniques and articles are also described.

20 Claims, 9 Drawing Sheets

(56) References Cited

U.S. PATENT DOCUMENTS

| | | | |
|---|---|---|---|
| 2017/0318019 A1* | 11/2017 | Gordon | G06V 40/10 |
| 2018/0109510 A1* | 4/2018 | Tommy | G06F 21/316 |
| 2020/0089855 A1* | 3/2020 | Chou | G06F 21/32 |
| 2020/0371673 A1* | 11/2020 | Faulkner | G06F 3/04842 |

* cited by examiner

EYE AND HEAD TRACKING AUTHENTICATION

TECHNICAL FIELD

The subject matter described herein relates to authentication via eye and head tracking.

BACKGROUND

Augmented reality (AR) is an interactive experience of a real-world environment where the objects that reside in the real-world are enhanced by computer-generated perceptual information, such as overlaying a person's visual field with graphics. A head-mounted display (HMD) is a display device worn on the forehead, such as a harness or helmet. HMDs place images of both the physical world and virtual objects over the user's field of view. Modern HMDs often employ sensors for six degrees of freedom monitoring that allow the system to align virtual information to the physical world and adjust accordingly with the user's head movements. HMDs can also be capable of monitoring the user's eye movement.

Virtual reality (VR) relates to technology for simulating an environment that can be similar to or completely different from the real world. Some virtual reality systems use headsets to generate realistic images, sounds and other sensations that simulate a user's physical presence in a virtual environment. Many VR headsets include a head-mounted display with a screen in front of the eyes that is capable of monitoring the user's eye movement and/or head movement.

SUMMARY

In an aspect, a system includes at least one data processor and memory storing instructions which, when executed by the at least one data processor, configures the at least one data processor to: provide, via a display, a visual stimulus including an animation containing at least a first object and a second object, the visual stimulus prompting for user input for authentication to a virtual domain; monitor movement of a user while providing the visual stimulus; identify, based on the monitoring, a sequence of dwell times of a characteristic of the user's movement with respect to the first object and the second object; compare the identified sequence of dwell times to a stored sequence of dwell times; and provide the comparison to enable authentication of the user in the virtual domain.

One or more of the following features can be included in any feasible combination. For example, the characteristic of the user's movement can characterize a direction of movement of the user, the direction of movement including an eye gaze direction and/or a head direction. The sequence of dwell times of the characteristic of the user's movement can include a first length of time that the direction of movement is toward the first object and a second length of time that the direction of movement is toward the second object. The animation can include a starting location of the first object, the starting location within a display space of the display, and/or the starting location randomized prior to providing the visual stimulus. The first object can move within a display space of the display according to a first path. The first object can move according to a second path different from the first path and during provision of the visual stimulus during a subsequent authentication of the user. The provided visual stimulus can include a presentation, using the display, of a set of images including the first object and the second object. The provided visual stimulus can include a presentation, using the display, of the first object for a predetermined amount of time. The provided visual stimulus can include a presentation, using the display, of a visualization characterizing a current dwell time of the characteristic of the user's movement.

The processor can be further configured to: prompt the user to initiate authentication of the user within the virtual domain; receive a request to authenticate the user within the virtual domain; and authenticate, based on the comparison, the user in the virtual domain. The authentication of the user in the virtual domain can include granting the user access to one or more electronic resources. The comparison can form a part of a multi-factor authentication. The processor can be further configured to: prompt the user to select different stimuli for use in future authentication. The identifying can include: comparing the monitored movements with known positions of the objects within the visual stimulus.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

While AR and VR devices include sensors for monitoring head and/or eye movement of a user, inputting information via head and/or eye movement can be cumbersome. This can be particularly evident when a user is required to authenticate into a virtual domain (such as a protected computing system or electronic resource) using the AR or VR device as the user interface. Authenticating to a virtual domain can include, for example, entering a username and a password to gain access to a computing system and/or electronic resource. The computing system can include the AR device, the VR device, or another computing system.

Existing AR and VR systems may display an image of a keyboard within the device display space and require the user to repeatedly look at and/or point their head towards static keys of the keyboard and then use a controller in order to input each character. For example, a user can gaze at the letter "A" on a display of a keyboard and then push a button on a controller (e.g., a physical pushbutton) to select the next character. Such an approach can be awkward for the user because it can require use of a separate controller device in order to input each character. In addition, if the user is not alone when entering a password, other individuals observing the user can clearly see the user's sequence of movements, rendering their password no longer secret.

Some implementations of the current subject matter can include presenting a visual stimulus to a user and monitoring eye and/or head movement over time to identify dwell times of the user's eye or head direction with respect to the displayed stimulus. By monitoring the dwell time with respect to the user's eye gaze or head movement in addition to monitoring where the user is looking or pointing their head, the user input includes a variable time dimension, enabling creation of more complex input sequences. These more complex input sequences can be more secure and can be considered as a secret sequences of gazes that represent the input (e.g., password) for authentication.

In addition, some implementations of the current subject matter can include presenting stimuli to the user that can include animations with objects (also referred to as images) that can be in motion. These objects can be moving about the display space, such that different objects are in different locations at different times. In some implementations, starting locations of the objects can be dynamic and change. By presenting stimuli to the user that includes an animation with moving objects and dynamic start positions, the exact sequence of gazes can change from one authentication to another (e.g., the actual sequence may change but is tied to a common secret), making authentication process more secure.

Accordingly, some implementations of the current subject matter can enable a user to authenticate into a protected system using eye-tracking or head-tracking functionality as the user interface.

Figure 1:
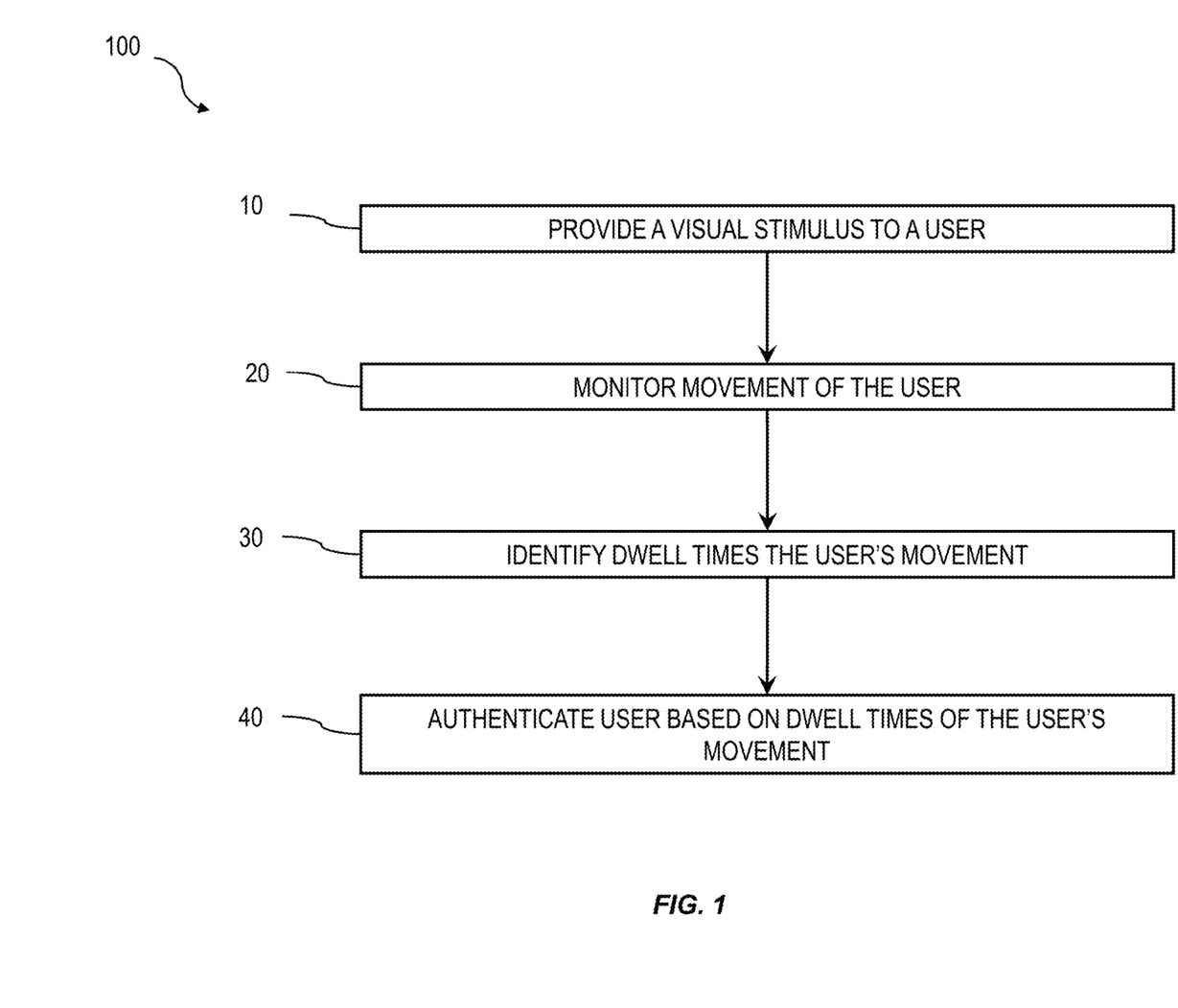
FIG. 1 is a process flow diagram illustrating an example process of authenticating via eye and/or head tracking that can provide for an improved authentication process.

FIG. 1 is a process flow diagram illustrating an example process of authenticating via eye and/or head tracking that can provide for an improved authentication process. The process can be implemented, for example, by a data processor receiving data characterizing user input from a VR headset, an AR headset, and/or a mobile device or data processor connected to a display and a front facing camera.

Figure 4A:
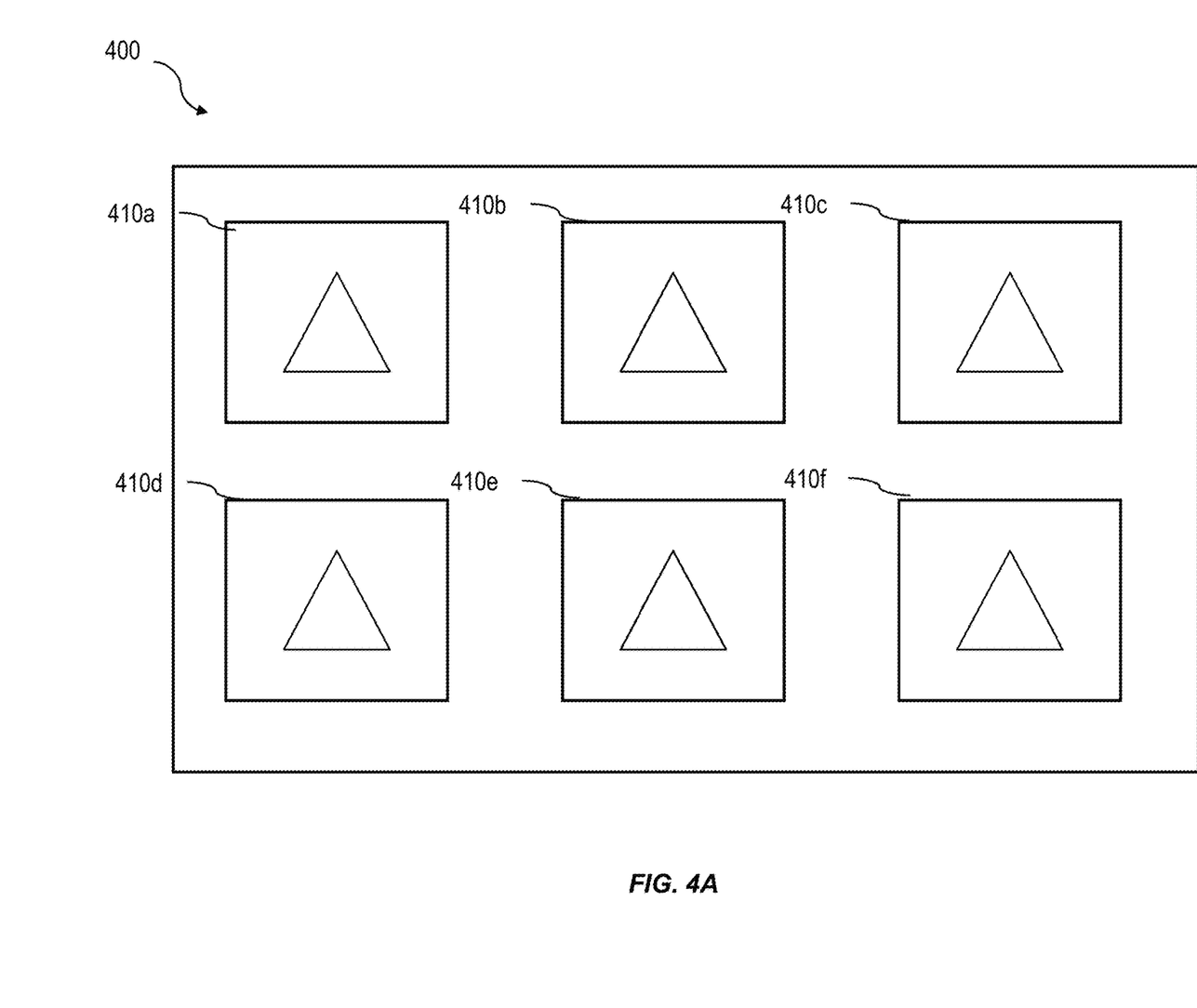
FIG. 4A is an illustration of an example display space having a set of six identical objects arranged in a grid.
Figure 4B:
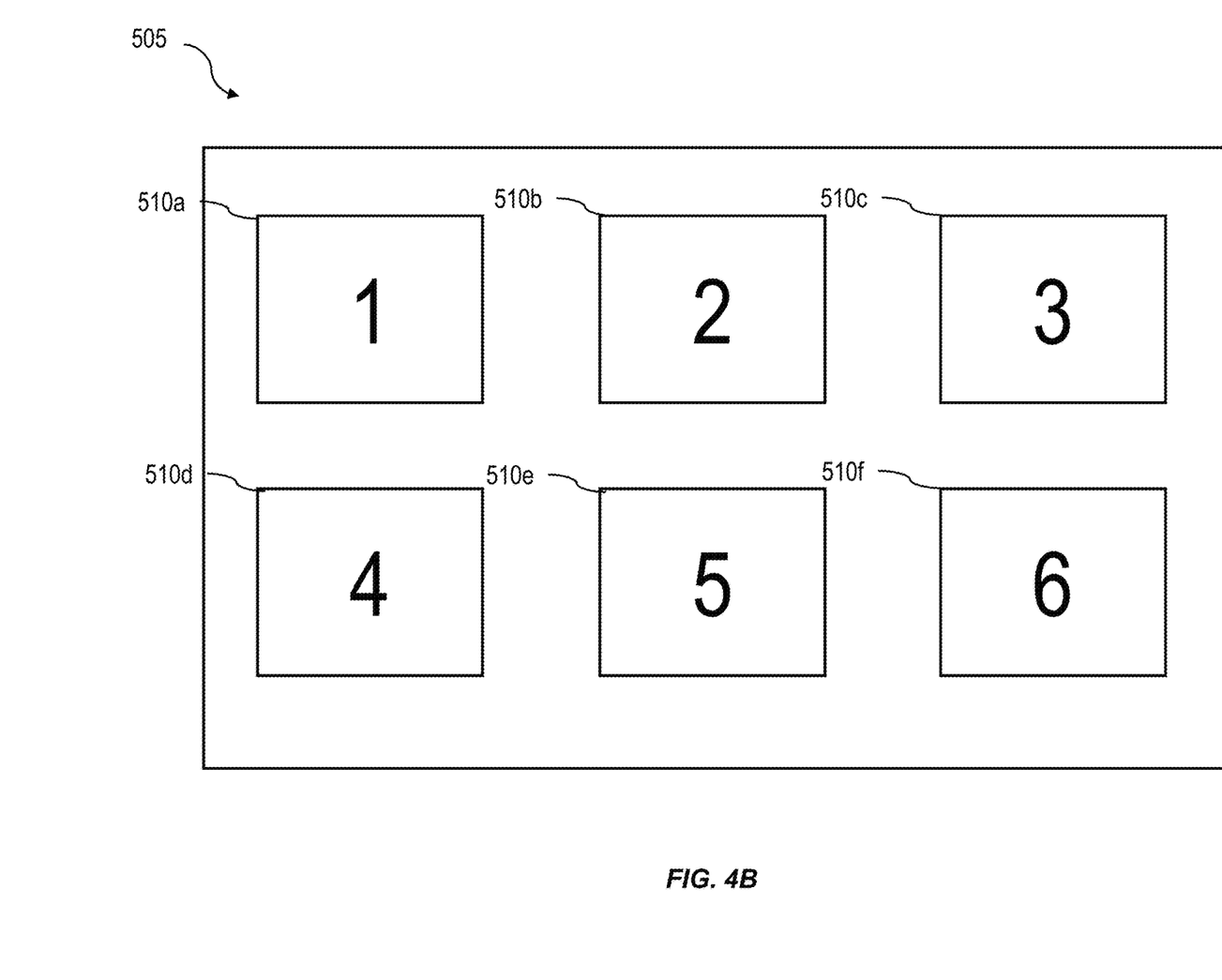
FIG. 4B is another example display space having a set of six different objects arranged in a grid

At 10, a visual stimulus is provided to a user. The visual stimulus can be provided within a display space, for example, within a display, projected onto a surface by a projector, and the like. The visual stimulus can include, for example, one or more objects such as numbers, shapes, images, and the like. The objects can be arranged in a pattern within the display space, for example, FIG. 4A is an illustration of an example display space 400 having a set of six identical objects 410a-f arranged in a grid. Each object 410a-f is a triangle within a square. By arranging the set of objects in a grid, the objects divide the display space into different regions to guide the user's gaze. FIG. 4B is another example display space 505 having a set of six different objects 510a-f arranged in a grid. Each object 510a-f is a different number, although other characteristics can be used to differentiate objects, such as color.

Figure 4C:
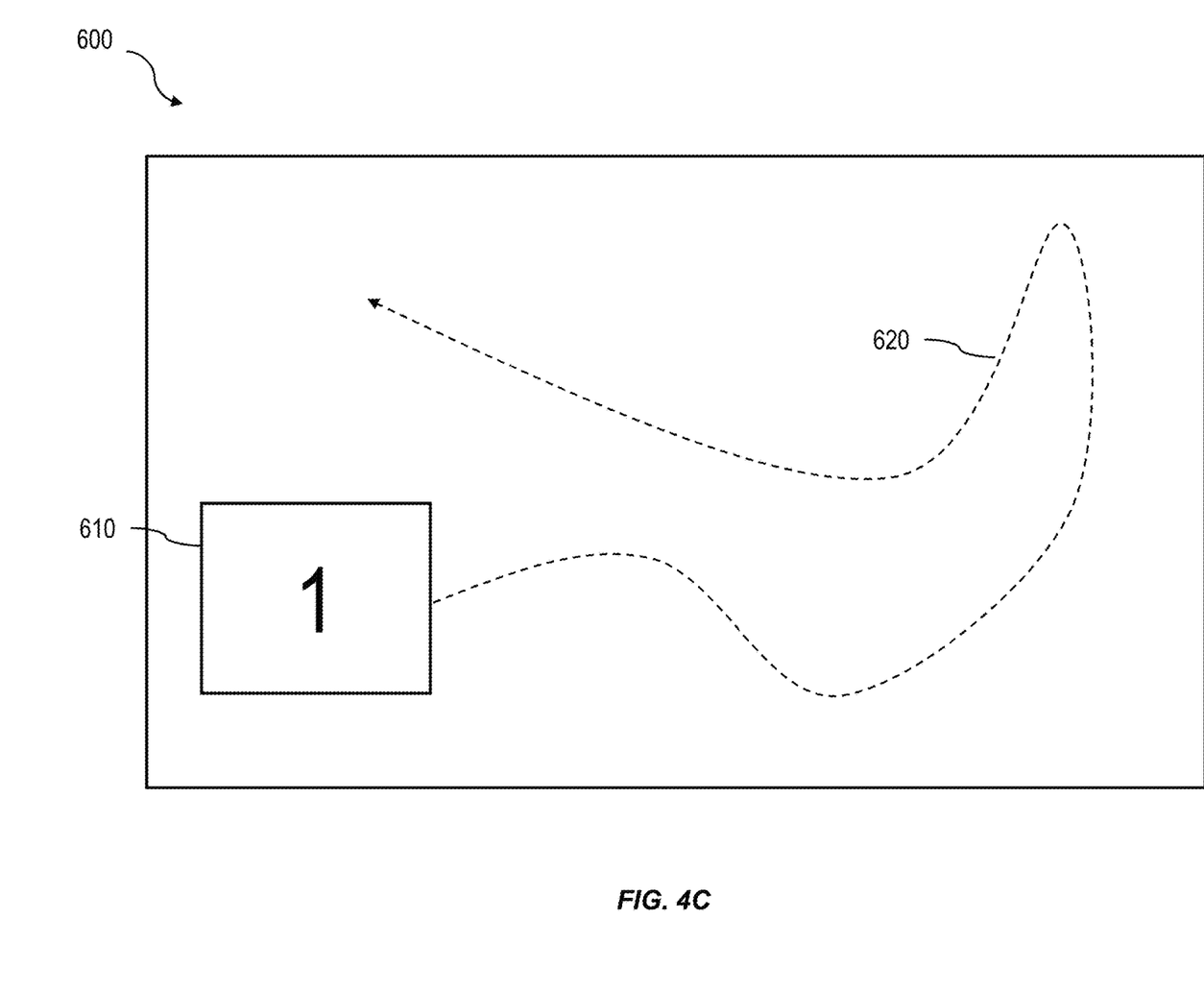
FIG. 4C illustrates an example display space in which an object traverses a path through the display space and over the course of the presentation of the stimulus.

The visual stimulus can include, for example, an animation containing one or more objects. The stimulus can be an animation in that at least one of the objects, background, foreground, and the like includes motion with respect to a display space in which the visual stimulus is provided. For example, FIG. 4C illustrates an example display space 600 in which an object 610 traverses a path 620 through the display space and over the course of the presentation of the stimulus.

In some implementations, some aspect of the position or motion of the object can be randomized such that the visual stimulus is dynamic between authentications. For example, if there are two moving objects such as a red circle and a blue circle, and the secret is that the user's gaze should follow the red circle, the starting position of both the red circle and blue circle can be chosen randomly prior to provision (e.g., display) such that the actual sequence of the user's gaze changes between authentications, even though the secret (e.g., follow the red circle) is unchanged.

Similarly, the path that the object traverses during provision of the visual stimulus can vary from one authentication to another. For example, consider the example with a moving red circle and a moving blue circle. The paths that each circle follows can be different between two authentication attempts. As a result, the actual sequence of the user's gaze changes between authentications, even though the secret (e.g., follow the red circle) is unchanged.

The objects can be provided for a predetermined amount of time. For example, the objects can be provided for 5, 10, 20, 30 seconds during which the user attempts to authenticate. In some implementations, each object can be provided for a different predetermined amount of time. For example, the user may see objects appear or disappear during presentation of the visual stimulus. Such dynamic visual stimulus can allow for more complex secrets to be used.

Figure 4D:
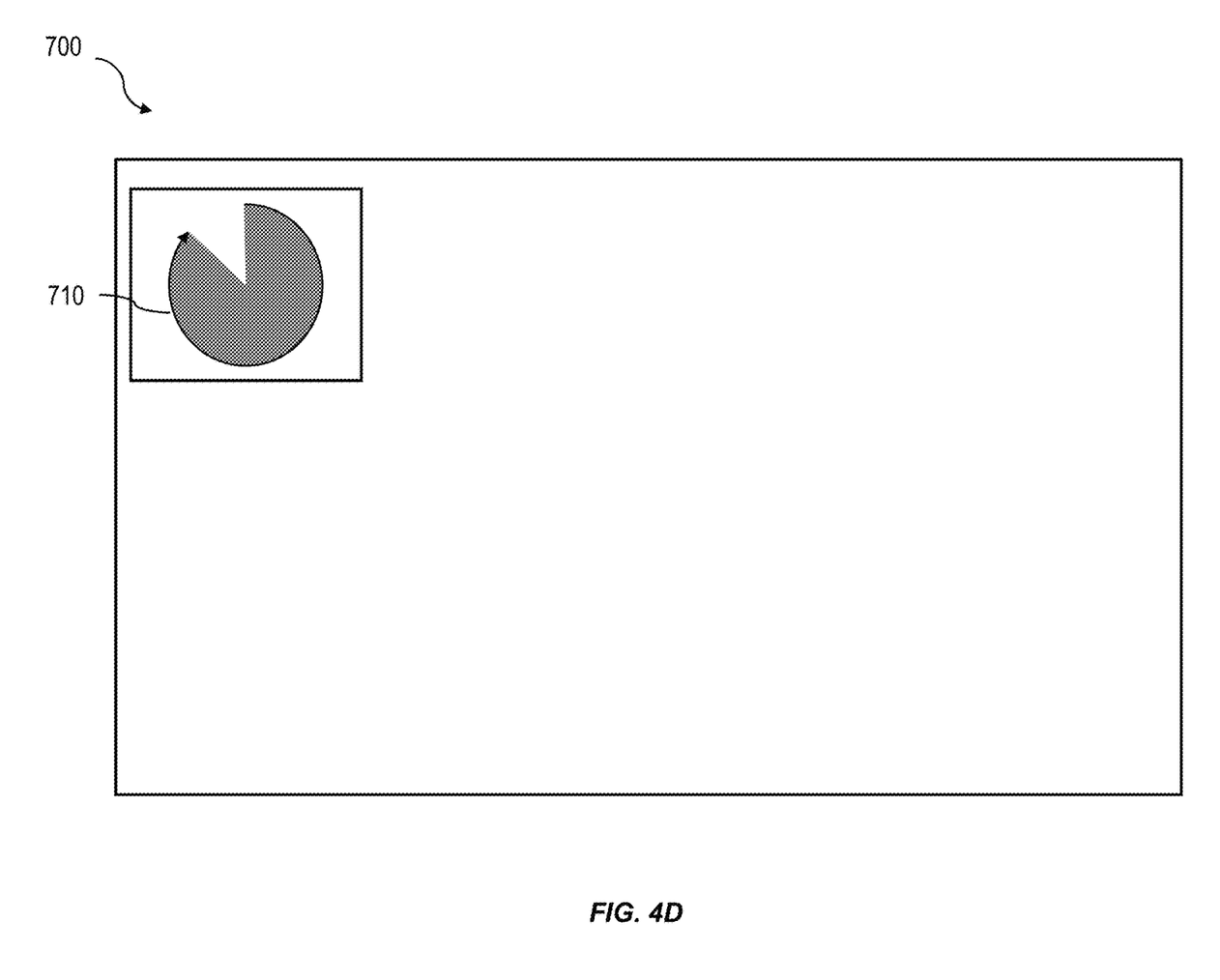
FIG. 4D illustrates an example display space including a visualization characterizing a current dwell time of the user's eye or head position.

Since the dwell time of a user's gaze is going to be monitored, providing the visual stimulus can include presenting a visualization characterizing a current dwell time of the user's eye or head position. For example, FIG. 4D illustrates an example display space 700 including a visualization 710 characterizing a current dwell time of the user's eye or head position. In the example illustrated, the visualization 710 takes the form of a clock or similar animation that conveys time. The visualization 710 can reflect an amount of time that the user has gazed at a certain object and can provide feedback to the user.

A visualization characterizing a current gaze dwell time can enable complex secret sequences that depend on dwell time. For example, in the above-mentioned example with two moving objects being a red circle and a blue circle, the secret sequence can be to gaze at the red ball for two seconds, then gaze at the blue ball for four seconds, then gaze at the red ball for 3 seconds. By providing a visualization characterizing the current gaze dwell time, the user can more accurately input the correct sequence.

Referring again to FIG. 1, at 20, movement of the user can be monitored. The monitoring can include monitoring eye movement, head movement, and the like. For example, eye tracking software can be utilized which analyzes eye position and computes a vector characterizing the gaze of the user. The monitoring can be continuous such that the computed vector updates regularly (e.g., several times a second).

In some implementations, monitoring movement of the user can be performed with accelerometers located within a head-worn device that can provide six degrees of freedom monitoring that allow monitoring of movement of the user with respect to the physical world. This can allow for a gaze of the user (e.g., where the user is looking) to be determined indirectly, rather than from an eye tracker directly measuring the position and movement of the user's eyes. Other approaches to measuring and monitoring user movement are possible.

The monitoring of movement can include monitoring a characteristic such as direction of movement (e.g., that the user's head or eyes are moving left, right, up, down, and the like) in addition to or as an alternative to the location at which the user is looking.

In some implementations, the monitoring of the movement can be used to adjust the visual stimulus. For example, if the display space forms part of an AR or VR device, the visual stimulus can be adjusted to always be at the center of the user's vision thereby compensating for some types of user movement. For example, if the visual stimulus is a pattern centered within the display space at a particular location, the visual stimulus can be modified based on the monitoring to maintain a relative location of the pattern of images with respect to a field of view associated with the user.

At 30, a sequence of dwell times of the user's movement is identified. The identifying can include, for example, comparing the monitored movements characterizing the eye gaze position (e.g., position on the display the user is looking) against the known position of the objects within the visual stimulus to determine how long a user looked at a particular object, which would be the dwell time for that object. A sequence of such dwell times can be identified.

Where the monitoring of movement of the user is performed with accelerometers located within a head-worn device that allow for movement of the user (e.g., where the user is looking) to be determined indirectly, rather than from an eye tracker directly measuring the position and movement of the user's eyes, the identified sequence of dwell times can characterize times that the direction of movement is toward objects.

At 40, the user can be authenticated based on the identified dwell times of the user's movement. For example, the identified sequence of dwell times can be compared to a stored sequence of dwell times. If they are similar according to a predefined criterion, the user can be authenticated. For example, the comparison can include comparing whether the user gazed at the correct objects and each dwell time is within 0.5 seconds of the dwell time specified by the stored sequence, the user can be authenticated. Thus, the user's movements can be utilized for authentication purposes. Authenticating can include granting the user access to one or more electronic resources such as an AR or VR device, a computing system, a virtual account, and the like.

In some implementations, prior to providing the visual stimulus, the user can be prompted to initiate authentication and the user can provide a request to authenticate. For example, the use can be prompted by presenting a prompt in the visual display space and the user can provide the request to authenticate via movement, such as eye or head movement.

In some implementations, the above-described authentication approach can form one part of a multi-factor authentication. For example, the current subject matter can be combined with other authentication techniques, such as facial recognition, voice recognition, and the like. In some implementations, the secret can be dynamic (e.g., change regularly) and can be retrieved by the user from, for example, a virtual access token that changes regularly (e.g., every 60 seconds). For example, a virtual access token can include a hardware key fob or software that creates an authentication code at fixed intervals (such as 60 seconds) using a built-in clock. The generated authentication code can form part of the secret. For example, the authentication code can include a string of numbers (e.g., "3-4-1") specifying dwell times for a given sequence (e.g., the user would look at a first object for 3 seconds, a second object for 4 seconds, and a third object for 1 second).

Figure 2:
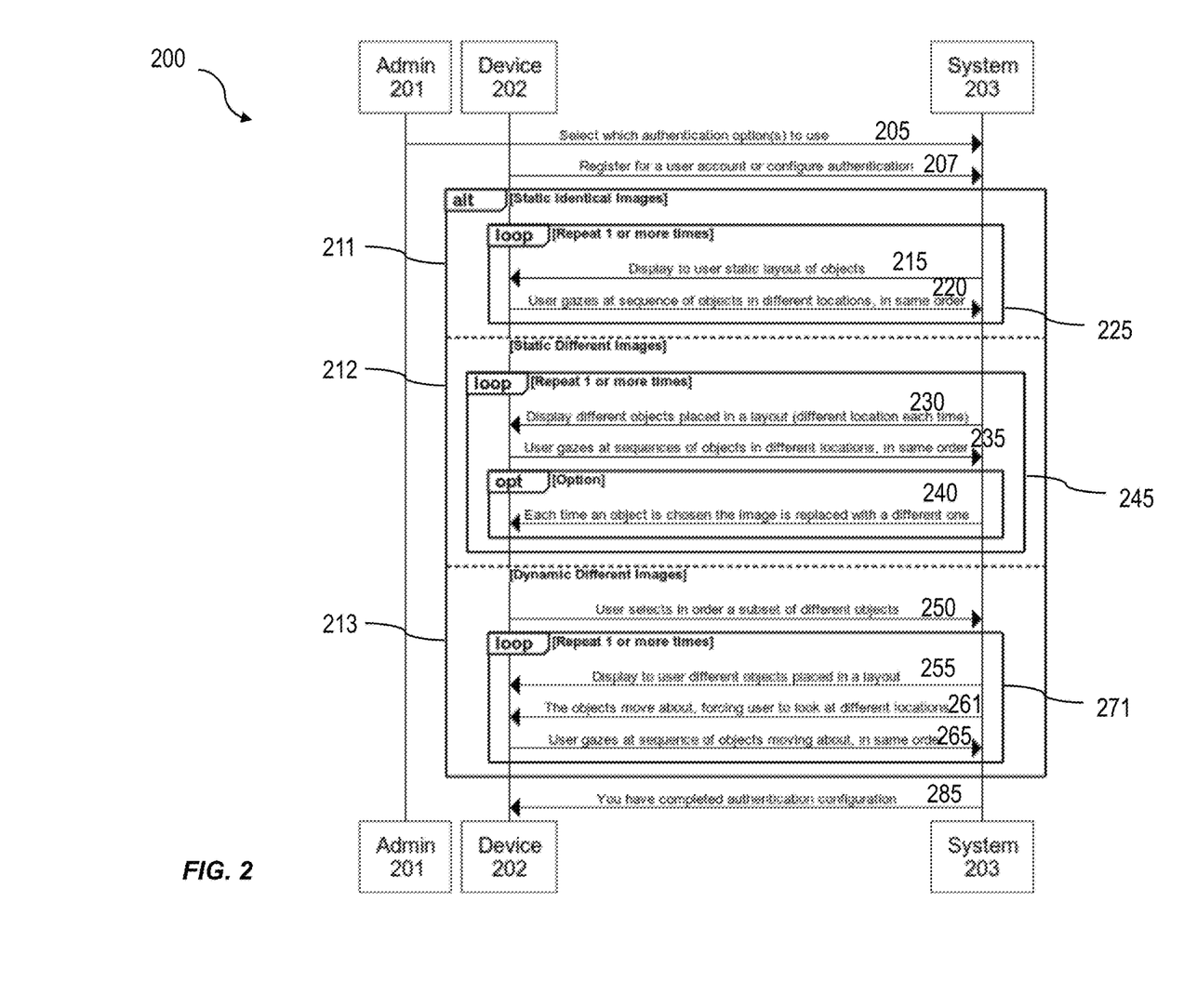
FIG. 2 is a data flow diagram illustrating an example process of configuring a system for authenticating via eye and/or head tracking that can provide for an improved authentication process.

FIG. 2 is a data flow diagram illustrating an example process 200 of configuring a system for authenticating via eye and/or head tracking that can provide for an improved authentication process. The process is performed among an administrator 201, a user device 202, and a computing system 203 such as a server. The user device 202 can include, for example, a VR headset, an AR headset, and/or a mobile device or data processor connected to a display and a front facing camera. In the illustrated example, the administrator 201 can specify authentication configuration settings for a user device 202 seeking to authenticate into a protected system. The authentication process can be enabled by computing system 203, which in some implementations can be the protected system, or can control access to the protected system.

At 205, administrator 201 can transmit the configuration settings to the computing system 203 regarding the options for authentication that should be used or required of the user device 202. The configuration settings can include which type of authentication should be used, for example, whether the animation should be dynamic, static, minimum length of required sequence, should form part of multi-authentication, and the like. Other configurations can be specified.

At 207, the user device 202 transmits a request to the computing system 203 requesting for registration of an account or to configure authentication. For example, the user device 202 can either request a new user account (e.g., by registering) for a protected system, or can request to create a new eye-tracking and/or head-tracking method for authentication for an existing user account.

At 210, the computing system 203 prompts the user device 202 to create a new secret sequence of gazes. The authentication approach can depend on the configuration settings provided by the administrator 201 at 205. If the configuration settings specified that the visual stimulus should be static identical objects (such as images that do not move on a display), then the steps indicated by 211 can be performed. If the configuration settings specified that the visual stimulus should be static different objects, then the steps indicated by 212 can be performed. If the configuration settings specified that the visual stimulus should be dynamic objects (e.g., red object moving on display screen), then the steps indicated by 213 can be performed. Each of 211, 212, and 213 can be considered as alternative steps which can be performed alternatively or in any feasible combination.

If the administrator 201 specified that static identical objects are to be used, then 211 is performed, which includes, at 215, the computing system 203 providing information to the user device 202 to display a static layout of identical objects. The static layout of identical objects can be, for example, as illustrated in FIG. 4A where each object in the grid is identical.

When presenting static identical objects with a device implementing eye-tracking, the user can be prompted to keep their head still and to use their eyes to gaze in a sequence of different directions. This can be facilitated by rendering, either on a screen or in the user's field of view, a pattern of identical objects (for example, a grid of dots or object such as in FIG. 4A). In some implementations, the pattern of objects can move with the user's head movement, so that the pattern is always located in the same location in the user's field of view. The user can be considered to be "PIN unlocking" with their eye movement.

When presenting static identical objects with a device implementing head-tracking, the user can be prompted to move their head (e.g., in an AR/VR headset) so that the center of their field of view looks in a sequence of different directions. This can be facilitated by rendering in the user's field of view the pattern of identical objects (for example, a grid of dots or objects such as in FIG. 4A). In this example implementation, the pattern of objects does not move with the head movement, and is effectively anchored to an area of space (with respect to the user) that is initially in front of the user. The user can be considered to be "PIN unlocking" with their head movement.

The user device 202 can display the static layout of objects to the user and, at 220, register the user gazing at the static layout of objects by monitoring movement of the user, such as their eye position or head direction, and corresponding dwell times. The user device 202 can store or transmit to the computing system 203 the sequence of gazes (including corresponding dwell times) registered by the user as the new stored secret sequence (e.g., the password).

At 225, the steps of providing information to display a static layout of objects (215) and registering the user's sequence of gazes (220) can repeat at 225 for one or more times depending, for example, on the options specified by the administrator 201.

If the administrator 201 specified that static different objects are to be used, then 212 is performed, which includes, at 230, the computing system 203 providing information to the user device 202 to display a static layout of different objects. The static layout of different objects can be, for example, as illustrated in FIG. 4B.

The user device 202 can prompt the user to select in order from a set of different objects, which can include different simple shapes or numbers, such as is illustrated in FIG. 4B, but can include more complex images, such as pictures of different vehicles, objects embedded in a picture or scene, and the like. In some implementations, the placement of the different images within the grid can vary, but the order in which they are chosen is registered as the secret sequence (e.g., password).

The user device 202 can display the static layout of different objects to the user and, at 235, register the user gazing at the static layout of different objects by monitoring movement of the user, such as their eye position or head direction. The user device 202 can store or transmit to the computing system 203 the sequence of gazes registered by the user as the new stored secret sequence (e.g., the password). In some implementations, the user can input a text reminder (e.g., a hint) regarding their chosen sequence. The user can be prompted to remember the series of different objects and their chosen order.

In some implementations, each time an object is chosen by the user (e.g., the user's movement registers a selection of an image), at 240, that object can be replaced by another different object.

In some implementations, the steps of providing information to the user device 202 to display a static layout of different objects can repeat at 245 for one or more times depending, for example, on the options specified by the administrator 201.

In some implementations of the static identical objects or static different objects, the user can elect to choose how long they should look at a particular object. The user device 202 can register the user gazing at the static layout of objects by monitoring movement of the user, such as their eye position or head direction, and determine respective dwell times (e.g., how long) for each object. In some implementations, a progress icon is displayed showing how long the user looks at the object or direction. An example progress icon is illustrated with respect to FIG. 4D. In some implementations, the progress icon can move in increments, for example blocks of 2 seconds, so that the user is not required to time a dwell time exactly but instead just within the correct 2 second block of time.

In some implementations, the user can be prompted to practice inputting their secret sequence one or more times, to ensure that they remember what they have chosen. The user can also be prompted to input a reminder (e.g., a hint) to ensure they remember what they have chosen. For example, where static identical objects with eye-tracking is used, the user can be prompted to repeat the motion they performed at 220. Where static identical objects with head-tracking is used, the user can be prompted to repeat the motion they performed at step 235. Where different static objects with eye-tracking or head-tracking is used, different objects can be displayed to the user (e.g., on a screen or in the user's field of vision).

In some implementations, the objects can be static while displayed, but once a user dwells on an object for the appropriate length of time, the object can be removed and replaced with a different object. The objects can change location every time that the user attempts authentication, which can prevent a malicious attacker from replicating the user's head or eye movements to gain unauthorized access to the protected system.

If the administrator 201 specified that a dynamic visual stimulus is to be used, then 213 are performed, which includes, at 250, the user device 202 providing information to the computing system 203 indicating an order of a subset of different objects. At 255, the user device can display the selected objects. At 261, the selected objects can form an animation such that the different objects move around the display space. The motion can include translational, rotational, be randomized, and the like.

At 265 the user device 202 can register the user gazing at the animation by monitoring movement of the user, such as their eye position or head direction, including dwell times on particular objects. The user device 202 can store or transmit to the computing system 203 the sequence of gazes (including dwell times) registered by the user as the new stored secret sequence (e.g., the password). The user can be prompted to remember the series of different moving objects, their chosen order and associated dwell times.

In some implementations, the steps of providing information to the user device 202 to display the animation can repeat at 271 for one or more times depending, for example, on the options specified by the administrator 201.

In some implementations, the movement of the objects and/or the starting position of the objects within the display space can be randomized or vary between attempts to authenticate. As a result, each object can be in a different location at a different time, which makes it harder for an observer to discern the secret sequence of gazes.

Figure 3:
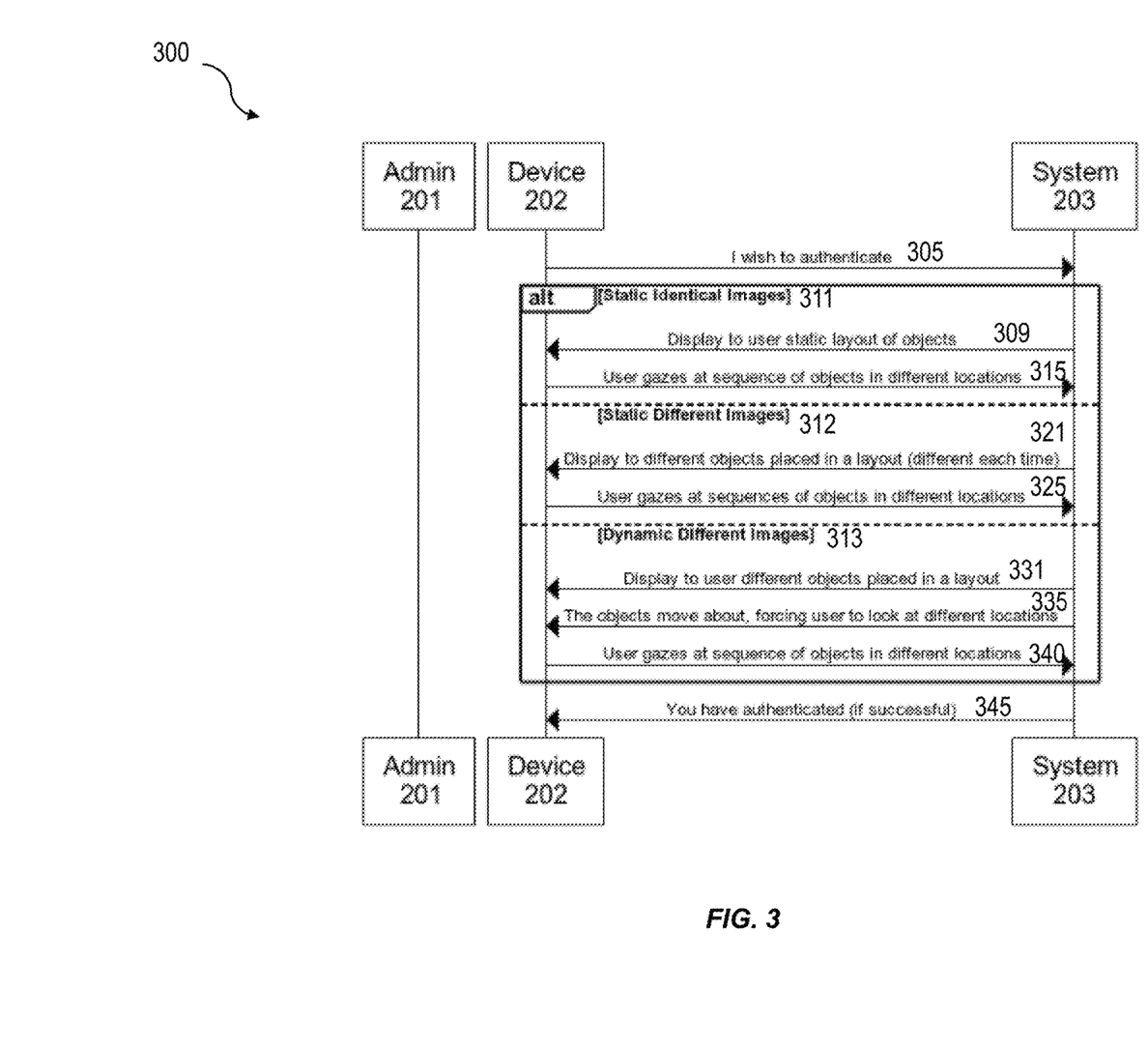
FIG. 3 is a data flow diagram illustrating an example process of authenticating after registering or configuring their account for eye-tracking and/or head tracking authentication.

The user at this point has now registered their user account, or finished adding their eye-tracking/head-tracking authentication method to their existing user account. FIG. 3 is a data flow diagram illustrating an example process 300 of authenticating after registering or configuring their account for eye-tracking and/or head tracking authentication. At 305, the user device 202 transmits a request to authenticate to the computing system 203. Depending on the specification of options provided by the administrator 201 at 205, the steps indicated by 311, 312, and 313 can be performed. Each of 311, 312, and 313 can be considered as alternative steps which can be performed alternatively or in any feasible combination.

If the administrator 201 specified in the configuration settings that static identical objects are to be used, then 311 is performed, which includes, at 309, displaying to the user the static objects. The user device 202 can display the static layout of objects to the user and, at 315, identify the user gazing at the static layout of objects by monitoring movement of the user, such as their eye position or head direction, and corresponding dwell times. The user device 202 can transmit the sequence of gazes (including corresponding dwell times) to the computing system 203, which can compare the identified sequence including corresponding dwell times to the stored secret sequence (e.g., the password). If the identified sequence matches the stored sequence, the computing system 203 can transmit, at 345, a confirmation that the user device 202 has been authenticated. Access to the protected system can be provided.

If the administrator 201 specified in the configuration settings that static different objects are to be used, then 312 is performed, which includes, at 321, displaying to the user the static objects. The user device 202 can display the static layout of objects to the user and, at 325, identify the user gazing at the static layout of objects by monitoring movement of the user, such as their eye position or head direction, and corresponding dwell times. The user device 202 can transmit the sequence of gazes to the computing system 203, which can compare the identified sequence including corresponding dwell times to the stored secret sequence (e.g., the password). If the identified sequence matches the stored sequence, the computing system 203 can transmit, at 345, a confirmation that the user device 202 has been authenticated. Access to the protected system can be provided.

If the administrator 201 specified in the configuration settings that a dynamic visual stimulus is to be used, then 313 is performed, which includes, at 331, displaying to the user the dynamic visual stimulus. The user device 202 can display the animation including moving objects to the user and, at 335, identify the user gazing at the moving objects by monitoring movement of the user, such as their eye position or head direction, and corresponding dwell times on the moving objects. The user device 202 can transmit the sequence of gazes to the computing system 203, which can compare the identified sequence including corresponding dwell times to the stored secret sequence (e.g., the password). If the identified sequence matches the stored sequence, the computing system 203 can transmit, at 345, a confirmation that the user device 202 has been authenticated. Access to the protected system can be provided.

Although a few variations have been described in detail above, other modifications or additions are possible. For example, the current subject matter is not limited to AR and VR devices, but can include devices such as mobile devices, laptops, and desktops that include a front facing camera enabling monitoring of the user's eye movement and gaze. While the above describes authentication of the user, the current subject matter can apply to inputting of any secret. For example, the current subject matter can be used to pair a Bluetooth device with another device. Other applications and uses are possible. In some implementations, the visual stimulus can include images that are user-provided, for example, uploaded by the user device.

The subject matter described herein provides many technical advantages. For example, the current subject matter can provide for secure authentication for systems based on user movement. In some implementations, the current subject matter can provide for an improved user interface, improving the manner in which a user interacts with a computing system.

Figure 5A:
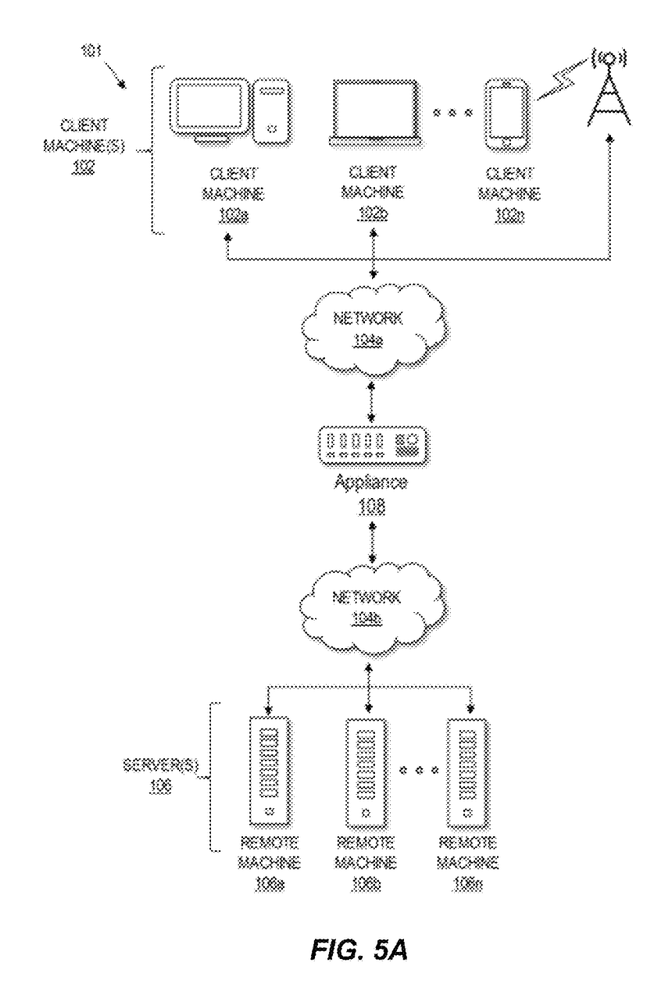
FIG. 5A depicts a network diagram illustrating an example of a network environment, in accordance with some example embodiments.

FIG. 5A depicts a network diagram illustrating an example of a network environment 101, in accordance with some example embodiments. Referring to FIG. 5A, the network environment 101 in which various aspects of the disclosure can be implemented can include one or more clients 102a-102n, one or more remote machines 106a-106n, one or more networks 104a and 104b, and one or more appliances 108 installed within the network environment 101. The clients 102a-102n communicate with the remote machines 106a-106n via the networks 104a and 104b.

The clients 102a-102n can include VR devices, AR devices, and/or data processors connected with displays and front facing cameras. As part of an authentication process, the clients 102a-102n can provide a visual stimulus to a user and monitor movement of the user (e.g., as described in more detail above with respect to FIG. 1). Identification of dwell times of the user's movement can be performed by the respective clients 102a-102n, appliances 108, or by the remote machines 106a-106n, depending on a particular implementation and/or application. For example, in some implementations, the protected system to which the user is attempting to authenticate can be a client 102a-102n, an appliance 108, a remote machine 106a-106n, or software executing on a computing system (which can include a client 102a-102n, a remote machine 106a-106n, or another computing system).

In some example embodiments, the clients 102a-102n can communicate with the remote machines 106a-106n via an appliance 108. The illustrated appliance 108 is positioned between the networks 104a and 104b, and can also be referred to as a network interface or gateway. In some example embodiments, the appliance 108 can operate as an application delivery controller (ADC) to provide clients with access to business applications and other data deployed in a datacenter, the cloud, or delivered as Software as a Service (SaaS) across a range of client devices, and/or provide other functionality such as load balancing and/or the like. In some example embodiments, multiple appliances 108 can be used, and the appliance(s) 108 can be deployed as part of the network 104a and/or 104b.

The clients 102a-102n can be generally referred to as client machines, local machines, clients, client nodes, client computers, client devices, computing devices, endpoints, or endpoint nodes. The clients 102a-102n can include, for example, the first client 110a, the second client 110b, and/or the like. The remote machines 106a-106n can be generally referred to as servers or a server farm. In some example embodiments, a client 102 can have the capacity to function as both a client node seeking access to resources provided by a server 106 and as a server 106 providing access to hosted resources for other clients 102a-102n. The networks 104a and 104b can be generally referred to as a network 104. The network 104 including the networks 104a and 104b can be configured in any combination of wired and wireless networks.

The servers 106 can include any server type of servers including, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. The servers 106 can include, for example, the server 120, the proxy server 130, the resource server 140, and/or the like.

A server 106 can execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft internet protocol telephone; an application for streaming video and/or audio; an application for facilitating real-time-data communications; a hypertext transfer protocol (HTTP) client; a file transfer protocol (FTP) client; an Oscar client; a Telnet client; or any other set of executable instructions.

In some example embodiments, a server 106 can execute a remote presentation services program or other program that uses a thin-client or a remote-display protocol to capture display output generated by an application executing on a server 106 and transmit the application display output to a client 102.

In yet other example embodiments, a server 106 can execute a virtual machine providing, to a user of a client 102, access to a computing environment. The client 102 can be a virtual machine. The virtual machine can be managed by, for example, a hypervisor, a virtual machine manager (VMM), or any other hardware virtualization technique within the server 106.

In some example embodiments, the network 104 can be a local-area network (LAN), a metropolitan area network (MAN), a wide area network (WAN), a primary public network, and/or a primary private network. Additional embodiments can include one or more mobile telephone networks that use various protocols to communicate among mobile devices. For short-range communications within a wireless local-area network (WLAN), the protocols can include 802.11, Bluetooth, and Near Field Communication (NFC).

Figure 5B:
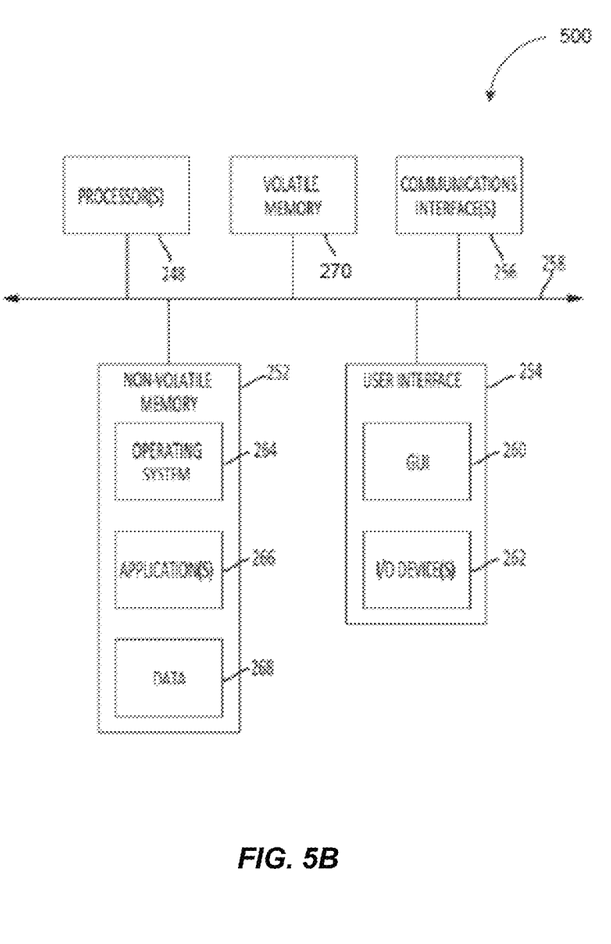
FIG. 5B depicts a block diagram illustrating an example of a computing device, in accordance with some example embodiments.

FIG. 5B depicts a block diagram illustrating an example of a computing device 500, in accordance with some example embodiments. Referring to FIGS. 5A-B, the computing device 500 can be useful for practicing an embodiment of the clients 102, the servers 106, and/or the appliances 108.

As shown in FIG. 5B, the computing device 500 can include one or more processors 248, volatile memory 270 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 can include a graphical user interface (GUI) 260 (e.g., a touchscreen, a display, and/or the like) and one or more input/output (I/O) devices 262 (e.g., a mouse, a keyboard, and/or the like). In some implementations, the one or more input/output devices 262 can include a front facing camera. The non-volatile memory 252 can store an operating system 264, one or more applications 266, and data 268 such that computer instructions of the operating system 264 and/or applications 266 are executed by the processor(s) 248 out of the volatile memory 270. Data can be entered using an input device of the GUI 260 or received from I/O device(s) 262. Various elements of the computing device 500 can communicate via communication the bus 258. The computing device 500 as shown in FIG. 5B is shown merely as an example, as the clients 102, the servers 106, and the appliances 108 can be implemented by any computing or processing environment and with any type of machine or set of machines that can have suitable hardware and/or software capable of operating as described herein.

The computing device 500 can perform one or more parts of an authentication process. For example, as part of an authentication process, the user interface 254 can provide a visual stimulus to a user via a graphical user interface (GUI) 260 and monitor movement of the user (e.g., as described in more detail above with respect to FIG. 1) with an input/output device 262. Identification of dwell times of the user's movement can be performed by the respective clients 102a-102n, appliances 108, or by the remote machines 106a-106n, depending on a particular implementation and/or application. In some implementations, the protected system to which the user is attempting to authenticate can be a client 102a-102n, a remote machine 106a-106n, or software executing on a computing system (which can include a client 102a-102n, a remote machine 106a-106n, or another computing system). Volatile memory 270 can store the previously stored secret sequence (e.g., password).

The processor(s) 248 can be implemented by one or more programmable processors executing one or more computer programs to perform the functions of the system. As used herein, the term "processor" describes an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some example embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" can be analog, digital or mixed-signal. In some example embodiments, the "processor" can be one or more physical processors or one or more "virtual" (e.g., remotely located or "cloud") processors.

The communications interfaces 256 can include one or more interfaces to enable the computing device 500 to access a computer network such as a local area network (LAN), a wide area network (WAN), a public land mobile network (PLMN), and/or the Internet through a variety of wired and/or wireless or cellular connections.

As noted above, in some example embodiments, one or more computing devices 500 can execute an application on behalf of a user of a client computing device (e.g., the clients 102), can execute a virtual machine, which provides an execution session within which applications execute on behalf of a user or a client computing device (e.g., the clients 102), such as a hosted desktop session, can execute a terminal services session to provide a hosted desktop environment, or can provide access to a computing environment including one or more of: one or more applications, one or more desktop applications, and one or more desktop sessions in which one or more applications can execute.

Additional examples of the implementation and operation of the network environment 101, the clients devices 102, the servers 106, and the appliances 108 can be as described in U.S. Pat. No. 9,538,345, issued on Jan. 3, 2017 to Citrix Systems, Inc., of Fort Lauderdale, Fla., the teachings of which are hereby incorporated herein by reference in their entirety.

One or more aspects or features of the subject matter described herein can be realized in digital electronic circuitry, integrated circuitry, specially designed application-specific integrated circuit (ASIC), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system comprising:
   at least one data processor; and
   memory storing instructions which, when executed by the at least one data processor, configures the at least one data processor to:
   provide, via a display, a visual stimulus including an animation comprising motion of at least a first object and a second object, the visual stimulus prompting for user input for authentication to a virtual domain;
   monitor, during a first time period, movement of a user while providing the visual stimulus;
   identify, based on the monitoring, a sequence of dwell times by identifying:
   a first dwell time corresponding to a characteristic of the movement of the user with respect to the first object at a first time, wherein, during the first dwell time, the first object is in a first location;

a second dwell time corresponding to the characteristic of the movement of the user with respect to the second object at a second time; and a third dwell time corresponding to the characteristic of the movement of the user with respect to the first object after the first time and the second time, wherein, during the third dwell time, the first object is in a different location from the first location;

determine a first stored sequence of dwell times that corresponds to the first time period, wherein a second computing device is configured to display, during each of a plurality of different time periods, a different series of numbers that indicates, to the user, a corresponding one of a plurality of different stored sequences of dwell times, and wherein, during the first time period, the second computing device is configured to display a first series of numbers that indicates, to the user, the first stored sequence of dwell times; and based on determining that the movement of the user corresponds to the first stored sequence of dwell times indicated by the first series of numbers by comparing the identified sequence of dwell times to the first stored sequence of dwell times, enabling authentication of the user in the virtual domain.

2. The system of claim 1, wherein the characteristic of the movement of the user characterizes a direction of movement of the user, the direction of movement including an eye gaze direction and/or a head direction.

3. The system of claim 2, wherein the sequence of dwell times indicates that the user looked at the first object, looked at the second object, then looked at the first object again.

4. The system of claim 1, wherein a starting location of the first object is randomized prior to providing the visual stimulus.

5. The system of claim 1, wherein the first object moves within a display space of the display according to a first path, and wherein the first object moves according to a second path different from the first path and during provision of the visual stimulus during a subsequent authentication of the user.

6. The system of claim 1, wherein the provided visual stimulus includes a presentation, using the display, of a set of images including the first object and the second object.

7. The system of claim 1, wherein the provided visual stimulus includes a presentation, using the display, of the first object for a predetermined amount of time.

8. The system of claim 1, wherein the provided visual stimulus includes a presentation, using the display, of a visualization characterizing a current dwell time of the characteristic of the movement of the user.

9. The system of claim 1, wherein the instructions, when executed by the at least one data processor, further cause the at east one data processor to:

prompt the user to initiate authentication of the user within the virtual domain;

receive a request to authenticate the user within the virtual domain; and authenticate, based on the determining that the movement of the user corresponds to the first stored sequence of dwell times indicated by the first series of numbers, the user in the virtual domain, wherein authentication of the user in the virtual domain includes granting the user access to one or more electronic resources.

10. The system of claim 1, wherein the second computing device comprises a hardware key fob.

11. The system of claim 1, wherein the instructions, when executed by the at least one data processor, further cause the at least one data processor to:

prompt the user to select different stimuli for use in future authentication.

12. The system of claim 1, wherein the instructions, when executed by the at least one data processor, cause the at least one data processor to identify the sequence of dwell times by causing the system to:

compare the monitored movement with known positions of the objects within the visual stimulus.

13. A method comprising:

providing, via a display, a visual stimulus including an animation comprising motion of at least a first object and a second object, the visual stimulus prompting for user input for authentication to a virtual domain;

monitoring, during a first time period, movement of a user while providing the visual stimulus;

identifying, based on the monitoring, a sequence of dwell times by identifying:

a first dwell time corresponding to a characteristic of the movement of the user with respect to the first object at a first time, wherein, during the first dwell time, the first object is in a first location;

a second dwell time corresponding to the characteristic of the movement of the user with respect to the second object at a second time; and a third dwell time corresponding to the characteristic of the movement of the user with respect to the first object after the first time and the second time, wherein, during the third dwell time, the first object is in a different location from the first location;

determining a first stored sequence of dwell times that corresponds to the first time period, wherein a second computing device is configured to display, during each of a plurality of different time periods, a different series of numbers that indicates, to the user, a corresponding one of a plurality of different stored sequences of dwell times, and wherein, during the first time period, the second computing device is configured to display a first series of numbers that indicates, to the user, the first stored sequence of dwell times; and based on determining that the movement of the user corresponds to the first stored sequence of dwell times indicated by the first series of numbers by comparing the identified sequence of dwell times to the first stored sequence of dwell times, enabling authentication of the user in the virtual domain.

14. The method of claim 13, wherein the characteristic of the movement of the user characterizes a direction of movement of the user, the direction of movement including an eye gaze direction and/or a head direction.

15. The method of claim 14, wherein the sequence of dwell times indicates that the user looked at the first object, looked at the second object, then looked at the first object again.

16. The method of claim 13, wherein a starting location of the first object is randomized prior to providing the visual stimulus.

17. The method of claim 13, wherein the first object moves within a display space of the display according to a first path, and wherein the first object moves according to a second path different from the first path and during provision of the visual stimulus during a subsequent authentication of the user.

18. The method of claim 13, wherein the provided visual stimulus includes a presentation, using the display, of a set of images including the first object and the second object.

19. The method of claim 13, wherein the provided visual stimulus includes a presentation, using the display, of the first object for a predetermined amount of time.

20. The method of claim 13, wherein the provided visual stimulus includes a presentation, using the display, of a visualization characterizing a current dwell time of the characteristic of the movement of the user.

* * * * *